Oct. 11, 1955 D. W. MOORE, JR 2,720,572

RESISTOR ELEMENT AND METHOD OF FABRICATING SAME

Filed March 23, 1950 3 Sheets-Sheet 1

*INVENTOR.*
DAVID W. MOORE JR.
*BY* Lawrence B. Dodds
ATTORNEY

RESISTOR ELEMENT AND METHOD OF FABRICATING SAME

INVENTOR.
DAVID W. MOORE JR.
BY Laurence B. Dodds
ATTORNEY

Oct. 11, 1955 D. W. MOORE, JR 2,720,572

RESISTOR ELEMENT AND METHOD OF FABRICATING SAME

Filed March 23, 1950 3 Sheets-Sheet 3

INVENTOR.
DAVID W. MOORE JR.
BY Laurence B. Dodds
ATTORNEY

1

2,720,572

RESISTOR ELEMENT AND METHOD OF FABRICATING SAME

David W. Moore, Jr., Pacific Palisades, Calif., assignor to Fairchild Camera and Instrument Corporation, a corporation of Delaware Application March 23, 1950, Serial No. 151,430

12 Claims. (Cl. 201—55)

Figure 1A:
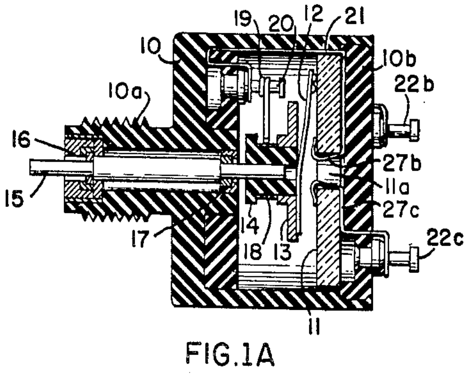

This invention relates to resistor elements and the method of fabricating the same and, more particularly, to such resistor elements suitable for embodiment in an adjustable resistor device including a movable contact and having a wide range of resistance values and accurately predetermined resistance-displacement characteristics.

In recent years there has been an increasing demand for adjustable resistance devices of a wide range of resistance values suitable for use in electronic computers and other electronic and electrical apparatus recently developed. Among the characteristics sought in resistance elements for such devices may be mentioned the following:

(1) Readily and accurately predeterminable resistance-displacement characteristics of linear taper or any other desired taper.

(2) Extreme stability with respect to temperature and humidity variations, etc., and age.

(3) High resolution, permitting accurate control of the resistance characteristic of the associated electrical circuit.

(4) High heat dissipation, permitting a high wattage rating for a given size resistor element.

(5) Resistor elements and contact elements individually and independently selectable for respective optimum characteristics; for example, a resistance element of extremely high resistance and a contact element having a low pressure, low resistance contact characteristic which renders it suitable for use in low-torque-sensitive control devices.

(6) Operational life of a great number of cycles to permit optimum operation over a maximum service life.

In prior commercial resistance elements, which have generally been of the wire-wound type, the same material constituted both the resistance element and the commutating element. Because of the low conductivity of the resistance material, a relatively high pressure was required between the contact and the commutating element resulting in unsatisfactory wear, a short service life, and a variation of the resistance-displacement characteristic with age. This was particularly true in the case of resistance elements of very high resistance values, which were conventionally formed of very fine resistance wire.

While heretofore certain resistance elements have been proposed in which different materials were utilized for the resistance element and the contact element, they have not to date found commercial success because they have been rather complex and costly and have otherwise failed to procure some or all of the above-mentioned desirable characteristics.

It is an object of the present invention, therefore, to provide a new and improved resistor element which avoids one or more of the above-mentioned disadvantages and limitations of resistor elements of the prior art.

It is another object of the invention to provide a new and improved resistor element having one or more of the advantageous characteristics discussed above and one

2 which has a long service life and a construction which is simple and economical and suitable for mass production.

It is a further object of the invention to provide a new and improved method of manufacturing resistance elements of the type described.

In accordance with the invention, in an adjustable resistor device including a movable contact there is provided a resistor element having a predetermined resistance-displacement characteristic comprising a form of insulation material and a low-resistance film formed on and bonded to the form, the film being segmented to form a series of adjacent aligned insulated commutator elements. The resistor element also includes a thin high-resistance film formed directly and entirely on and bridging portions of the commutator elements and bonded thereto and to the form, the exposed portions of the commutator elements serving as a commutator for a movable contact.

Further in accordance with the invention, a method of fabricating a film-type resistor element on a form of insulating material comprises the steps of applying a film strip of metal-bearing coating to a form, drying the coating, scribing such coating after drying to form a series of adjacent aligned insulated elements, treating the coated form at an elevated temperature to reduce the coating to a high-conductivity metallic coating, and depositing a thin high-resistance film directly and entirely on and bridging portions of the aligned metallic elements, leaving aligned portions of said elements exposed to form a commutator.

By the term "thin high-resistance film," as used herein and in the appended claims, is meant a film in which the high resistance is determined primarily by the thinness of the film and, secondarily, by the specific resistance of the material of which the film is composed. It is contemplated that such films may be of a thickness within the range of a few molecules to a few thousandths of an inch. By the term "pure metal film," as used herein and in the appended claims, is meant a primarily native metallic film but which may nevertheless comprise an alloy or mixture of several metallic elements.

For a better understanding of the present invention, together with other and further objects thereof, reference is had to the following description taken in connection with the accompanying drawings, while its scope will be pointed out in the appended claims.

Figure 1B:
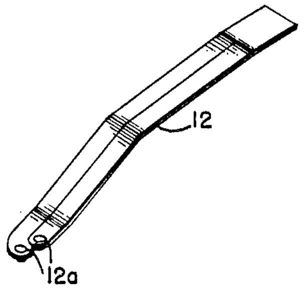
Figure 1C:
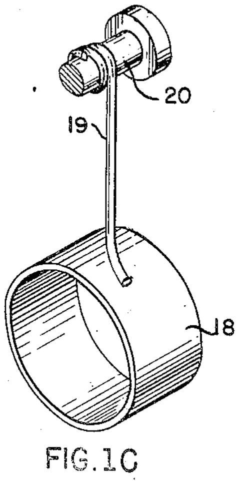
Figure 1D:
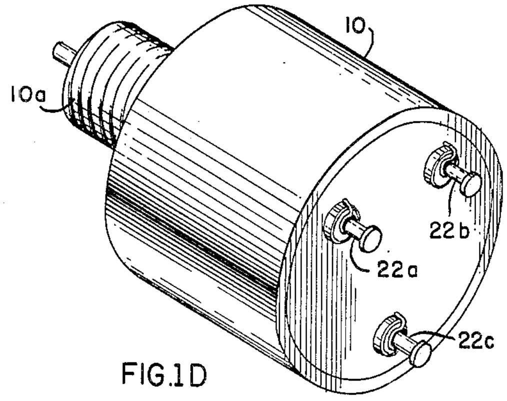
Figure 1E:
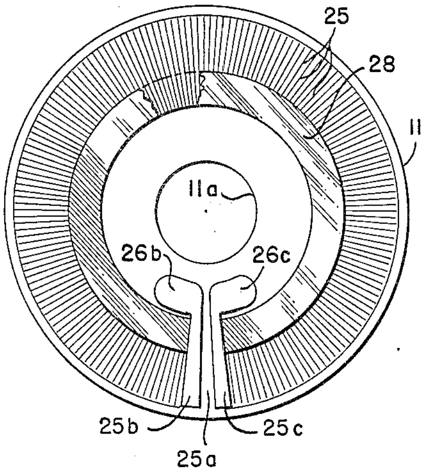
Figures 2A, 2B:
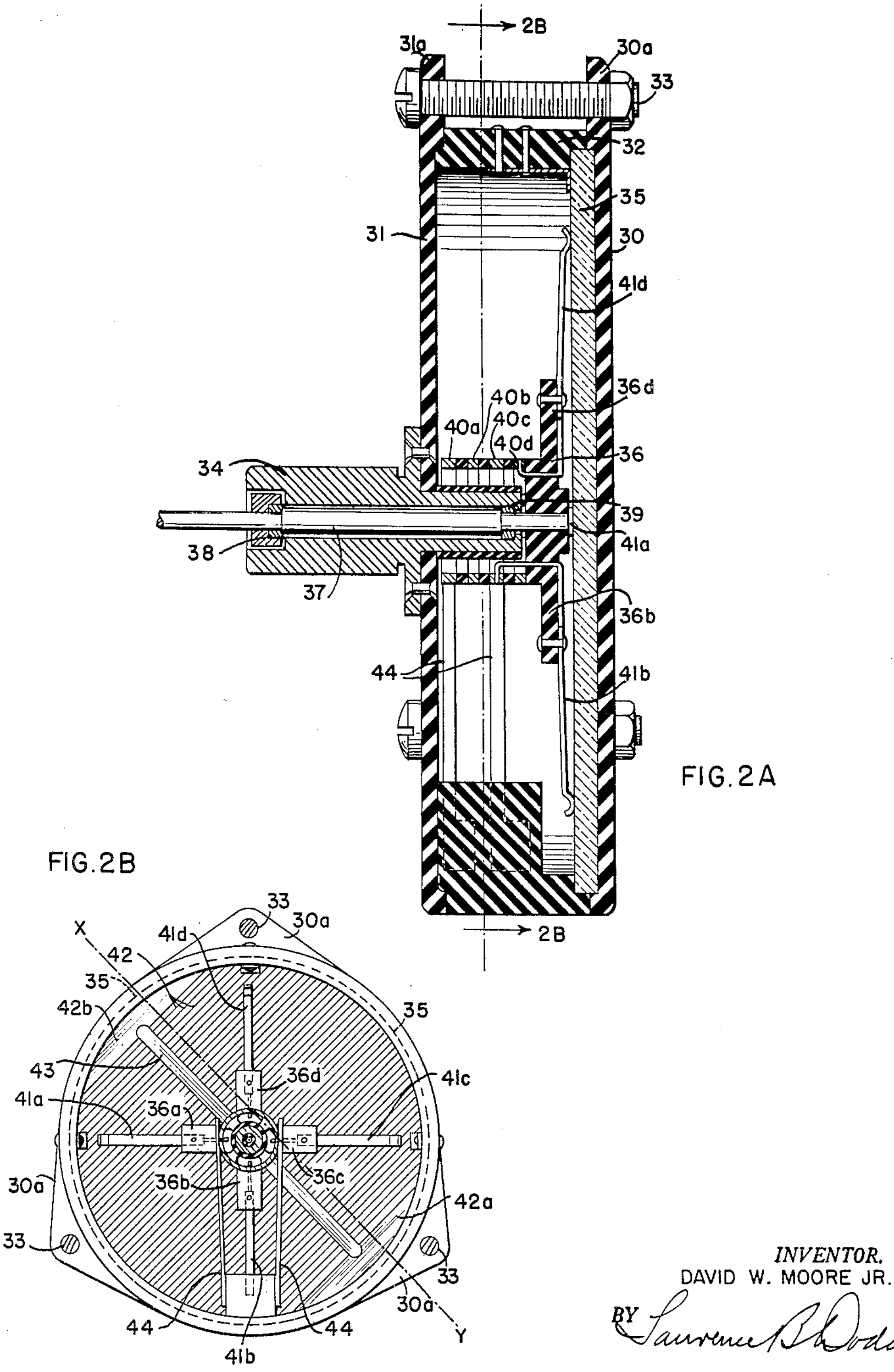
Figure 3A:
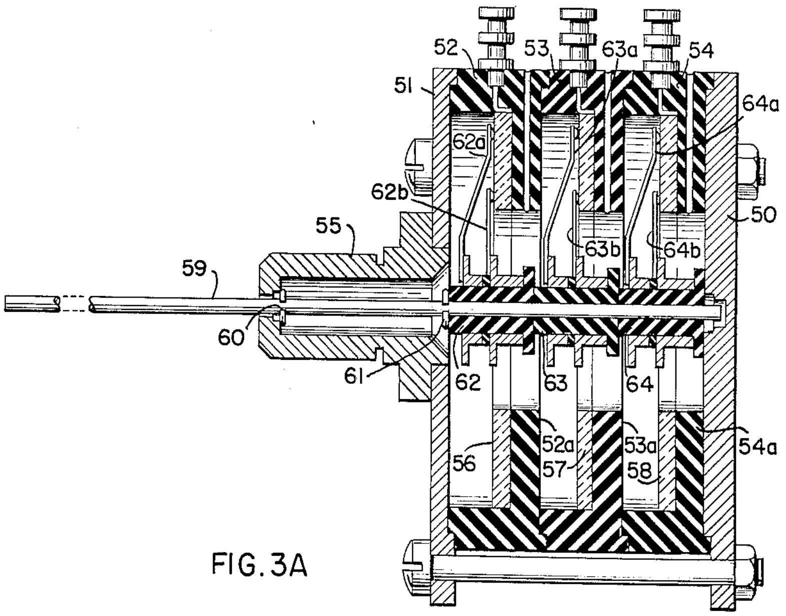
Figure 3B:
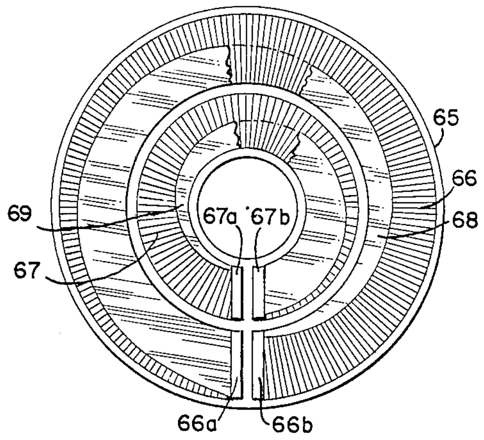

Referring now to the drawings, Fig. 1A is a view in elevation, partly in section, of an adjustable resistor device including a resistor element embodying the invention; Figs. 1B and 1C are detailed perspective views of contact and brush elements, respectively, of the apparatus of Fig. 1A; Fig. 1D is a perspective view of the complete adjustable resistor device of Fig. 1A; Fig. 1E is an enlarged plan view of a resistor element embodying the invention and incorporated in the device of Fig. 1A; Fig. 2A is a view in elevation, partly in section, of a sine-cosine-resolver incorporating a resistor element embodying the invention, while Fig. 2B is a cross-sectional view of the device of Fig. 2A showing in detail the resistor element embodying the invention; Fig. 3A is a longitudinal sectional view of a multiple-element adjustable resistor device including a plurality of resistor elements embodying the invention; while Fig. 3B is an enlarged detailed view of one of the resistor elements of the device of Fig. 3A.

Referring now more particularly to Figs. 1A–1E, inclusive, of the drawings, there is illustrated an adjustable resistor device incorporating a resistor element embodying the invention. This device includes a cylindrical cup-like housing 10 of molded plastic or other suitable material having an extending threaded hub **10*a* suitable for mounting on a panel or other supporting element. The open end of the housing 10 is closed by a disc 10*b*** of suitable insulation material. Mounted on and secured to the inner face of the disc **10*b* is the resistor element embodying the invention and comprising a form of insulation material, such as a circular glass disc 11 having a central aperture 11*a*. The resistor device also includes a movable or rotatable contact element 12 which may be in the form of an elongated bifurcated strip of resilient conductive material, such as beryllium copper, terminating at its free end in axially aligned contact points 12*a*, 12*a*. One end of the contact element 12 is electrically bonded and secured to a conductive flange 13 mounted on a hub 14 of insulation material which, in turn, is mounted on a shaft 15 to which is attached an operating element (not shown). The shaft 15 extends through the hub portion 10*a* of housing 10 and is supported therefrom by spaced antifriction bearings 16, 17 which are preferably of the ballbearing or jewel type in order to reduce to a minimum the required operating torque of the shaft 15. Disposed on the hub 14 is a conductive slip ring 18 electrically bonded to the conductive flange 13. Bearing on the slip ring 18 is a brush 19 supported from and electrically connected to a terminal post 20. The post 20 is electrically connected, as by a conductor 21, to one of the three external terminal posts 22*a*, 22*b*, and 22*c*. The brush 19** is constructed of a material having a low contact resistance, for example, a resilient gold alloy.

The resistor element is shown in more detail in Fig. 1E. It comprises the circular glass disc 11 having an annular low-resistance film 25, such as metallic silver, formed on and bonded to the form as by the method described hereinafter. The film 25 is segmented as by a scribing process, described hereinafter, to form a series of adjacent aligned insulated commutator elements which may be of the order of 100 to 500 per inch, depending upon the resolution required. The film 25 is interrupted at **25*a* and end portions 25*b* and 25*c* on either side thereof are left unsegmented to form commutator terminal portions. An additional terminal conductive film of high conductivity, for example, of metallic silver, is bonded to the portions 25*b*, 25*c* and extends therefrom to form terminals 26*b* and 26*c*, respectively, which are connected by conductors 27*b* and 27*c*, respectively, extending through the aperture 11*a* and through the closing disc 10*b* and making connection with appropriate ones of the external terminal posts 22*a*, 22*b*, 22*c***.

Superimposed on the annular segmented conductive film 25 is a thin high-resistance film 28 which may be of any suitable material, such as a metal, a metal alloy, graphite, etc.; at present, the preferred material is a nickel-chromium alloy having a composition approximately 60% nickel, 25% iron, and 15% chromium, such as that commercially available under the trade mark "Nichrome." This film is formed directly on the commutator elements by the method described hereinafter and bridges portions of these elements and is bonded thereto and to the glass disc or form 11. The configuration of this high-resistance film 28 is determined by the desired taper of the resistance-displacement characteristic of the resistance element. In the event a linear characteristic is desired, the film 28 is of annular configuration having uniform width, as shown. Any desired resistance-displacement characteristic may be obtained by giving the film a substantially annular configuration but of a width varying in a predetermined way related to the function represented by the resistance-displacement characteristic.

The thickness of the film 28 will vary with the desired total resistance of the resistance element, which may have practically any assigned value, resistors of the type described embodying the invention having been constructed having maximum resistance values within the range of from 10 to 2,000,000 ohms. Films having thicknesses within the range of a few molecules to a few thousandths of an inch may be utilized. In certain resistors utilizing a nickel-chromium alloy film, thicknesses have been of the order of 50 molecules. The exposed portions of the commutator elements 25 form an annular path for the movable contact 12 and serve as a commutator for the device.

There follows a description of a method of fabricating the film-type resistor element of the apparatus described which has been found commercially practicable. Initially the glass disc 11 is masked by a form to expose a desired commutating area. A film strip of metal-bearing coating is applied to the form by applying a metal-bearing compound to the masked form. A satisfactory example of such metal-bearing compound is the silver paint having a composition of 75% finely divided flaked metallic silver and 25% finely divided or powdered glass suspended in a chemically inert vaporizable liquid vehicle in an amount to form a moderately viscous liquid, that is, a liquid suitable for use in commercial spray guns. One such composition is commercially available as Dupont No. 4760 silver paint. This coating on the disc 11 is then segmented to form a series of adjacent, aligned, insulated commutator elements. For example, the coating may be air-dried and scribed after drying in a conventional indexing machine to form the commutator elements. Depending upon the accuracy required, this scribing may form up to 500 or more commutator segments per inch.

The form 11 with the dried coating is then treated at an elevated temperature. For example, with the use of the silver paint mentioned, the element is fired at a temperature within the range of 900° to 1200° F., preferably at approximately 1100° F., for a period of 10 minutes, which reduces the coating to a hard high-conductivity metallic silver coating which is bonded firmly to the glass and is capable of withstanding extreme wear. Alternatively, the film may be dried and fired without segmenting and then segmented after firing.

The form 11, with the commutator formed as described, is then masked to expose a desired resistance area. Specifically, the mask is precisely machined to have a configuration, and with a tolerance, corresponding to the desired resistance taper and required accuracy, respectively, and the mask is applied to the resistor form. Preferably at least one of the peripheries of the mask is circular, while the other, which may be either the inner or outer periphery, may deviate from a circle if a non-linear resistance taper is desired. A thin high-resistance film is then deposited on the masked form 11 to bridge portions of the aligned metallic commutator elements, while leaving peripheral aligned portions of such elements exposed to form a commutator. The deposition of the high-resistance metallic film may be by any of several well-known processes. One process which has been found commercially satisfactory is that of thermal evaporation by the method described in Patent No. 2,586,752 of Weber et al. entitled "Formation of Metallic Films by Thermal Evaporation."

As mentioned above, the thickness of the film, which is determined primarily by the evaporation time as described in aforesaid Weber et al. application, may vary from a few molecules to a few thousandths of an inch, depending upon the desired resistance value. The resistance of the film is determined primarily by the thickness of the film, which may vary over an extremely wide range and, secondarily, by the specific resistance of the film material, which varies over a much lesser range.

After fabrication of the resistor element as described, terminals are formed by applying a suitable mask and painting with a suitable composition to form the terminal portions **26*b*, 26*c***. These terminal portions may be formed of the silver paint described above.

Thus, there is provided by the invention a precision resistor element in which the resistance material has a large surface area deposited on commutator bars of high thermal and electrical conductivity, thus providing a maximum thermal dissipation so that a resistor element of any given size has a maximum wattage rating. At the same time, the extremely fine segmentation of the commutator film provides a resistor element of high resolution. A resistance-displacement characteristic of any desired taper and any desired accuracy is readily obtainable by the use of a mask machined to the appropriate configuration with the required tolerance and both the resistance film and the commutator elements are extremely stable with respect to variations in temperature, humidity, etc., and age. At the same time, the resistance material and the material of the commutator are individually and independently selected for their respective optimum characteristics. For example, the commutator film of high conductive material, such as silver, has a low contact resistance, permitting the use of low-pressure contact elements so that, when embodied in an adjustable resistor device, a minimum torque is required, rendering it suitable for embodiment in sensitive control apparatus.

Referring now to Figs. 2A and 2B of the drawings, there is illustrated a sine-cosine resolving device comprising a resistor element embodying a modified form of the invention. This device comprises a housing including a pair of circular discs 30, 31 held in position by an annular spacing ring 32, the discs having projecting ears 30*a* and 31*a*, respectively, through which pass a number of clamping bolts 33. The elements 30 and 31 may be of molded plastic or other suitable material. Element 32 is of suitable insulation material. Secured to the disc 31 by rivets, bolts, or the like, is a central supporting hub 34. Mounted on and secured to the inner face of disc 30 is the resistor element embodying the invention comprising a circular form 35 of glass or other suitable insulation material. The device also includes a rotatable contact assembly comprising a flanged hub 36 having four radially extending arms 36*a*, 36*b*, 36*c*, and 36*d*, formed of insulation material and mounted on a shaft 37 extending through the hub 34 and supported therefrom by spaced anti-friction bearings 38 and 39. Secured to the hub 36 is a collector assembly comprising four collector rings 40*a*, 40*b*, 40*c*, and 40*d* with intervening rings or discs of insulation material. A series of brushes 44 individually bear on collector rings 40*a*–40*d*, inclusive. Riveted or otherwise secured to the arms 36*a*–36*d*, inclusive, are a series of quadrature-spaced elongated contact elements 41*a*–41*d*, respectively, which are individually electrically connected to the collector rings 40*a*–40*d*, respectively, by suitable conductors. The contact elements 41*a*–41*d*, inclusive, are of resilient conductive material, such as a suitable gold alloy.

The resistor element of the device of Fig. 2A is shown in more detail in Fig. 2B. The circular disc 35 has a low-resistance film 42, such as metallic silver, formed on and bonded to the entire surface of the form. The film 42 is segmented across the disc rather than radially, as in the resistor element of Fig. 1E, to form a series of parallel insulated commutator elements and is left with unsegmented end portions 42*a* and 42*b* to form terminal portions for external connection. The film 42 may be formed on the form 35 and segmented by the process described above in connection with Fig. 1E.

Superimposed on the segmented film 42 is a strip of thin high-resistance film 43 which may be of the same type as the thin high-resistance film 28 of Fig. 1E and formed in the same manner. The brushes 44 and the terminal portions 42*a*, 42*b* of the segmented conductive film 42 are brought out to suitable external terminals (not shown) in any conventional manner.

The general operation of the sine-consine resolving unit of Figs. 2A and 2B is generally similar to that of the resistor device of Figs. 1A–1E, inclusive. The contact elements 41*a*–41*d*, inclusive, make contact with the exposed segmented commutator elements of the conductive film 42, while the thin high-resistance film 43 bonded to and bridging an annular portion of the segmented film comprises a resistance element of large surface area deposited on commutator bars of high thermal and electrical conductivity, so that the unit has the desirable characteristics described above in connection with the resistor unit of Figs. 1A–1E, inclusive. The configuration of the strip 43 is such that, as a contact traverses the commutator film 42 between the terminal portions 42*a* and 42*b*, for example, along the straight line *x*—*y* of Fig. 2B, the resistance between such a contact and either terminal varies linearly. With such a construction, the value of the resistance between one pair of diametrically opposed contact elements, for example, elements 41*d*, 41*b*, as the shaft 37 is rotated through one revolution, varies as one trigonometric function, for example, the sine function, of the displacement of the shaft, while the resistance value between the other diametrically opposed contact elements 41*a* and 41*c* varies as the complementary function, that is, the cosine function. By applying a suitable potential to the terminal portions 42*a*, 42*b* of the unit, potentials varying as the sine and cosine functions of the applied potential may be derived from the pairs of terminals 41*b*, 41*d* and 41*a*, 41*c*, respectively. Such a sine-cosine resolving unit has been found of considerable value for embodiment in electrical and electronic computers for making computations involving trigonometric functions.

In Figs. 3A and 3B there is illustrated an embodiment of a plurality of resistor elements of the invention in a multi-element adjustable resistor device. This device includes a cylindrical housing formed of a pair of circular discs 50 and 51 secured in place by a plurality of annular spacing rings 52, 53, and 54. Secured to the disc 51 is an extending hub 55. The elements 50–55, inclusive, are of molded plastic or other suitable insulation material. The rings 52, 53, and 54 have inwardly extending radial flanges 52*a*, 53*a*, and 54*a*, respectively. Individually mounted on and secured to the flanges 52*a*, 53*a*, and 54*a* are resistor elements 56, 57, and 58, respectively. A supporting shaft 59 for the contact assembly extends through the hub 55 and is supported therefrom in antifriction bearings 60 and 61. Mounted on the shaft 59 are three contact and collector assemblies comprising flanged hubs 62, 63, and 64 having individually disposed thereon pairs of radially extending contact elements 62*a*, 62*b*; 63*a*, 63*b*; and 64*a*, 64*b*. Each of the contact assemblies 62, 63, and 64 includes conductive collector rings on which bear appropriate contact brushes. The collector rings and brush elements may be similar to those of the apparatus of Figs. 2A and 2B and are omitted for the sake of clarity.

Each of the resistor elements 56, 57, and 58 may be of the form illustrated in Fig. 3B, although it will be understood that the absolute values and the resistance-displacement characteristics of the resistance elements may vary as required. The resistor element of Fig. 3B which, for example, may represent the element 56, comprises a circular glass disc 65 on which are formed two separate concentric annular low-resistance strips of film 66 and 67, such as metallic silver, formed on and bonded to the disc 65. The annular films 66, 67 are segmented radially to form a pair of commutator strips. The forming of the films 66 and 67 and the segmenting thereof may be performed in accordance with the process described above. Superimposed on the films 66 and 67 are thin high-resistance films 68 and 69, respectively, which may also be of the character and formed by the method described in connection with the resistor device of Figs. 1A–1E, inclusive. The conductive films 66 and 67 are provided with separated unsegmented terminal portions 66*a*, 66*b* and 67*a*, 67*b*, respectively. These terminal portions and the brushes bearing on the collector rings are connected to external terminals (not shown) as in the resistor device of Figs. 1A–1E, inclusive.

While the resistance film of the resistor element of Fig. 1E has an annular configuration imparting to the device a linear resistance-displacement characteristic, it is seen that the resistance films 68 and 69 of the element of Fig. 3B, while substantially annular, are tapered in opposite directions. If the taper is linear, that is, increases in width uniformly throughout the length of the film, the corresponding resistor element will have a power-law characteristic. By appropriately selecting the slope of this taper, the unit may be given a characteristic following a square-law, third power law, etc. Alternatively, the configuration of either or both of the high-resistance films 68 and 69 may be given any desired non-linear taper to impart to the element any desired non-linear characteristic. In any event, if the desired resistance-displacement characteristic of the element is represented by the relation $R=f(x)$, the configuration of the film is expressed by the relation:

$$y=\frac{k}{\frac{d[f(x)]}{dx}}$$

where $y$=width of the resistance film strip; and $k$=a constant dependent upon the thickness of the high-resistance film and the specific resistance of the film material.

It will be clear that the two resistance elements on each of the units 56, 57, and 58 of the apparatus of Fig. 3A may have the same or different resistance-displacement characteristics in accordance with the requirements of the apparatus in which the multi-element resistor device is to be embodied. Each of the resistance elements will have the advantageous characteristics described above in connection with the resistor device of Figs. 1A–1E, inclusive. It will be also apparent that the multi-element resistor device of Fig. 3A may comprise any desired number of resistor units and that each unit may have disposed thereon any desired number of concentric thin high-resistance films. Each resistance film may have a configuration selected to impart to it an independently predetermined resistance-displacement characteristic.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an adjustable resistor device including a movable contact, a resistor element having a predetermined resistance-displacement characteristic comprising: a form of insulation material; a low-resistance film formed on and bonded to said form, said film being segmented to form a series of adjacent aligned insulated commutator elements; and a thin high-resistance film formed directly and entirely on and bridging portions of said commutator elements and bonded thereto and to said form, the exposed portions of said commutator elements serving as a commutator for a movable contact.

2. In an adjustable resistor device including a movable contact, a resistor element having a predetermined resistance-displacement characteristic comprising: a glass disc; an annular low-resistance film formed on and bonded to said form, said film being segmented to form a series of adjacent aligned insulated commutator elements; and a thin high-resistance film formed directly and entirely on and bridging portions of said commutator elements and bonded thereto and to said form, the exposed portions of said commutator elements serving as a commutator for a movable contact.

3. In an adjustable resistor device including a movable contact, a resistor element having a predetermined resistance-displacement characteristic comprising: a form of insulation material; a low-resistance film formed on and bonded to said form, said film being segmented to form a series of adjacent aligned insulated commutator elements with unsegmented terminal portions; a thin high-resistance film formed directly and entirely on and bridging portions of said commutator elements and bonded thereto and to said form, the exposed portions of said commutator elements serving as a commutator for a movable contact; and a pair of terminals individually bonded to said terminal portions.

4. In an adjustable resistor device including a movable contact, a resistor element having a predetermined resistance-displacement characteristic comprising: a form of insulation material; a low-resistance pure metallic film formed on and bonded to said form, said film being segmented to form a series of adjacent aligned insulated commutator elements; and a high-resistance pure metallic film formed directly and entirely on and bridging portions of said commutator elements and bonded thereto and to said form, the exposed portions of said commutator elements serving as a commutator for a movable contact.

5. In an adjustable resistor device including a movable contact, a resistor element having a predetermined resistance-displacement characteristic comprising: a form of insulation material; a low-resistance metallic silver film formed on and bonded to said form, said film being segmented to form a series of adjacent aligned insulated commutator elements; and a thin high-resistance film of nickel-chromium alloy formed directly and entirely on and bridging portions of said commutator elements and bonded thereto and to said form, the exposed portions of said commutator elements serving as a commutator for a movable contact.

6. In an adjustable resistor device including a movable contact, a high-resolution precision resistor element having a predetermined resistance-displacement characteristic comprising: a form of insulation material; a low-resistance film formed on and bonded to said form, said film being scribed of the order of 100 lines per inch to form a series of adjacent aligned insulated commutator elements; and a thin high-resistance film formed directly and entirely on and bridging portions of said commutator elements and bonded thereto and to said form, the exposed portions of said commutator elements serving as a commutator for a movable contact.

7. In an adjustable resistor device including a movable contact, a high-resolution precision resistor element having a predetermined resistance-displacement characteristic comprising: a form of insulation material; a low-resistance film formed on and bonded to said form, said film being scribed 100 to 500 lines per inch to form a series of adjacent aligned insulated commutator elements; and a thin high-resistance film formed directly and entirely on and bridging portions of said commutator elements and bonded thereto and to said form, the exposed portions of said commutator elements serving as a commutator for a movable contact.

8. In an adjustable resistor device including a movable contact, a resistor element having a predetermined resistance-displacement characteristic comprising: a form of insulation material; a low-resistance film formed on and bonded to said form, said film being segmented to form a series of adjacent aligned insulated commutator elements; and a high-resistance film of a thickness within the range of a few molecules to a few thousandths of an inch formed directly and entirely on and bridging portions of said commutator elements and bonded thereto and to said form, the exposed portions of said commutator elements serving as a commutator for a movable contact.

9. In an adjustable resistor device including a movable contact, a resistor element having a predetermined resistance-displacement characteristic comprising: a form of insulation material; a low-resistance film formed on and bonded to said form, said film being segmented to form a series of adjacent aligned insulated commutator elements; and a high-resistance film of a thickness of the order of 50 molecules formed directly and entirely on and bridging portions of said commutator elements and bonded thereto and to said form, the exposed portions of said commutator elements serving as a commutator for a movable contact.

10. In a multi-element adjustable resistor device including a plurality of movable contacts, a resistor unit including a plurality of resistance elements each having an independent predetermined resistance-displacement characteristic comprising: a form of insulation material; a plurality of separate strips of low-resistance film formed on and bonded to said form, said film being segmented to form a series of adjacent aligned insulated commutator elements; and a high-resistance film formed directly and entirely on and bridging portions of each of said series of said commutator elements and bonded thereto and to said form, the exposed portions of each of said series of commutator elements serving as a commutator for a movable contact.

11. A sine-cosine resolving resistor element comprising: a disc-shaped form of insulation material; a low-resistance film formed on and bonded to a face of said form, said film being segmented across said form to form a series of adjacent parallel insulated commutator elements; a high-resistance film formed directly and entirely on and bridging portions of said commutator elements and bonded thereto and to said form, the exposed portions of said commutator elements serving as a commutator; and four radial contact elements spaced in quadrature and disposed to contact said exposed commutator elements.

12. The method of fabricating a film-type resistor element on a form of insulating material comprising: applying a film strip of metal-bearing coating to a form; drying said coating; scribing said coating after drying to form a series of adjacent aligned insulated elements; treating the coated form at an elevated temperature to reduce the coating to a high-conductivity metallic coating; and depositing a thin high-resistance film directly and entirely on and bridging portions of said aligned metallic elements, leaving aligned portions of said elements exposed to form a commutator.

References Cited in the file of this patent

UNITED STATES PATENTS

| | | |
|---|---|---|
| Re. 23,219 | Moore | Apr. 11, 1950 |
| 1,819,246 | Jones | Aug. 18, 1931 |
| 1,881,444 | Flanzer | Oct. 11, 1932 |
| 2,404,387 | Lovell et al. | July 23, 1946 |